United States Patent Office 3,439,015
Patented Apr. 15, 1969

3,439,015
PROCESS FOR RING HALOGENATING ALKYL-SUBSTITUTED AROMATIC ISOCYANATES
Herbert Felix McShane, Jr., Wilmington, Del., assignor to E. I. du Pont de Nemours and Company, Wilmington, Del., a corporation of Delaware
No Drawing. Filed Apr. 15, 1964, Ser. No. 360,066
Int. Cl. C07c 119/04
U.S. Cl. 260—453                                          4 Claims

ABSTRACT OF THE DISCLOSURE

Process for preparing ring halogenated alkyl-substituted aromatic isocyanates of high purity and improved yield, in which process a catalyst such as ferric chloride is used in a liquid system, a halogen reactant being thoroughly mixed in said system, the concentration of hydrogen halide by-product being controlled and significantly decreased.

---

The halogenation of aromatic isocyanates in the presence of iodine or ferric chloride catalysts is well known. Mono- and dichlorination of diisocyanates in the absence of catalyst has also been described. Halogenation has been carried out directly on liquid or molten isocyanates or on solutions of isocyanates in inert solvents. The teachings of U.S. Patents Nos. 2,915,545 and 2,945,875 are representative of the present state of this art.

Application of existing art to the halogenation of alkyl-substituted aromatic isocyanates has not been found to be entirely satisfactory. This is especially true as the scale of the halogenation operation is increased, but difficulties are encountered even in the laboratory. Several problems arise in the case of the alkyl-substituted aromatic isocyanates which do not occur with unalkylated aromatic isocyanates. Alpha-halogenation may occur as well as ring halogenation with alkylated isocyanates. In order to minimize the undesirable alpha-halogenation, reaction temperatures must be lowered in an effort to reach an acceptable compromise between the rates of ring halogenation and alpha-halogen by-product formation. Unfortunately, at temperatures where the rate of alpha-halogenation is acceptable, it has been found that the rate of the ring halogenation reaction decreases with time. The rate may even approach zero. If the temperature is increased in an effort to accelerate ring halogenation, alpha-halogenation is encountered to an extent which is generally unacceptable. The original rate of ring halogenation may be reestablished by stopping the halogen feed and sparging the reaction mass with an inert gas at a temperature above that permissible during actual halogenation. On cooling and restarting the halogen feed, the rate of ring halogenation is acceptable for a short period of time, but soon decreases again. Heating and sparging must then be repeated. These complications are sufficiently involved to prevent economical operation on a commercial scale. In addition, the operating problems are coupled with a low yield (down to 60%) resulting from the formation of alpha-halogenated isocyanates and accompanying tarry nonvolatile by-products of unknown structure.

It is therefore an object of the present invention to provide an improved process for preparing ring-halogenated alkyl-substituted aromatic isocyanates. Other objects will appear hereinafter.

The general method for preparing ring-halogenated alkyl-substituted aromatic isocyanate is to contact the corresponding isocyanate in a liquid system with the desired halogen in the presence of a catalyst. During the course of such a process, hydrogen halide is produced as a by-product.

It has now been discovered that by controlling the amount of hydrogen halide by-product present in the liquid system during halogenation, the formation of undesired materials, such as alpha-halogenated isocyanate and tarry by-products, can be controlled. More particularly, it has been found that by reducing the amount of hydrogen halide present in the liquid system or reaction mass, the formation of these undesirable materials is minimized for any given feed rate of halogen reactant. Thus, the process of the present invention provides an economical route for preparing ring-halogenated alkyl-substituted aromatic isocyanates in high yields without the need for periodic reactivation of the halogenation system. Because of the relative purity of the ring-halogenated isocyanates produced according to the process of the present invention, they have the advantage over the isocyanates produced by prior art procedures in being suitable for some applications without the customary purification by distillation. For example, the isocyanate reaction product obtained according to the present process need only be heated to a temperature in the range of 150° to 220° C. (short of distillation) and the residual halide simultaneously removed by reducing the pressure of the reaction system or by sparging the reaction mass with an inert gas in order to render it suitable for use in the preparation of rigid polyurethane foams such as may be used for flame-resistance purposes. The isocyanate reaction mass can also be distilled at reduced pressure to be suitable for the many applications of the ring-halogenated isocyanates obtained by prior art methods and distillation.

In the preferred aspect of the general halogenation reaction, the alkyl-substituted aromatic isocyanate (includes a mixture of different isocyanates or isomers thereof) is contacted with chlorine or bromine, or halogen obtained from a compound yielding such halogen, such as bromine monochloride, or mixtures thereof in the presence of a catalytic amount of ferric chloride or ferric bromide to form a reaction mass. The improved yield of ring-halogenated product is obtained by reducing the concentration of hydrogen halide present in the reaction mass. This reduction in concentration is to occur for a particular rate of halogenation. In other words, as the concentration of hydrogen halide normally resulting from a particular rate of halogenation and a given set of reaction conditions is reduced, the purity of ring-halogenated product increases. Generally under this comparative basis, the greater the reduction in hydrogen halide level, the better the purity of desired product.

According to the concentration of hydrogen halide considered to be present in known procedures for ring-halogenating alkyl-substituted aromatic isocyanates, a concentration of 0.6 milliequivalent/gram (meq./g.) of reaction mass is considered well below previously existing amounts. Consequently, the improved operational characteristic of the process of the present invention can be defined as maintaining the concentration of hydrogen halide below 0.6 meq./g. of reaction mass during halogenation. This limit and other meq./g. values discussed in the specification and claims relate to a reaction mass consisting solely or reactants; solvent may be present when desired but does not enter into the calculation of meq./g.

The mechanism accounting for the beneficial results obtained by lowering the hydrogen halide concentration according to the process of the present invention has not been ascertained. This lowering is especially important in preparing polyhalogenated products, for the rate of ring halogenation decreases markedly as the degree of halogenation increases under even the best conditions.

The improved process of the present invention is similar in some respects to prior art processes which are adequate for the ring halogenation of unalkylated aromatic isocyanates in which the alpha-halogenation problem is absent. Liquid alkylated isocyanates or those melting below about 120° C. may be halogenated without dilution by an inert solvent. Higher melting isocyanates may be dissolved in inert solvents, such as fully halogenated aliphatic compounds. The halogenation may be conducted at temperatures ranging from about 60 to 135° C. with the temperature range of 80 to 115° C. being preferred. Temperatures below 60° C. may be used but are seldom practical because of the low rates of reaction encountered. Temperatures above 135° C. may also be used, but in general, the alpha-halogenation reaction will assume such significance that the product will be too impure for most applications.

The preferred catalysts of the prior art are effective in the present process. These include anhydrous ferric chloride or ferric bromide employed in concentrations ranging from about 0.2 to 5.0% by weight based on the isocyanate. In this improved process, amounts ranging from 0.5 to 3.0% are preferred. With lower amounts of catalyst, the rate of the ring halogenation may be so restricted that an excessive amount of alpha-halogenation products may be formed. Likewise, in the absence of catalysts, the proportion of alpha-halogenation is usually prohibitive. Amounts of ferric chloride in excess of even 3.0% usually are not required to provide an acceptable rate of ring halogenation. Since the catalyst represents a contaminant when the product is not distilled and a still residue when it is distilled, the amount employed should be the minimum amount which produces an acceptable rate of ring halogenation.

Control, i. e., lowering of the hydrogen halide concentration to attain the improved results of the present invention, is obtained by controlling certain reaction conditions as described hereinafter.

During halogenation, hydrogen halide is produced as a by-product and it concentrates in the reaction mass in amounts determined mainly by (1) the temperature, (2) the partial pressure of hydrogen halide in the gas phase in contact with the liquid reaction mass and (3) the effectiveness of liquid-gas contacting in the reaction mass. Generally, within the temperature ranges previously discussed, the lower the reaction temperature, the greater the solubility of hydrogen halide in the reaction mass. While the solubility of hydrogen halide can be reduced significantly by increasing the temperature, the advantage of this method of control must be weighed against the increasing tendency of alpha-halogenation to occur, depending on the particular isocyanate reactant present.

In another method of control, the partial pressure of hydrogen halide in the gas phase in contact with the reaction mass is determined by the total pressure existing in the system and the molar proportion of hydrogen halide in the gas phase. With respect to the total pressure existing in the system, the greater the total pressure, the greater will be the partial pressure of hydrogen halide for any given mole fraction of hydrogen halide in the gas phase. For this reason, operation at essentially atmospheric pressure is preferred with the improved process of this invention. In some cases moderate pressures such as those that would be encountered at the bottom of a countercurrent bubble cap or sieve plate tower reactor as a result of pressure drop within the equipment, may be used. In countercurrent tower reactors, this increase in pressure is compensated for by the high concentration of halogen which is present in the lower portions of the reactor. Generally, superatmospheric pressures should be avoided. Operation at subatmospheric pressures may be used to advantage on some occasions, but usually the resulting reduction in hydrogen halide concentration obtained by operating under vacuum can be achieved more economically by other means. With respect to the influence of the molar proportion or mole fraction hydrogen halide on the partial pressure of hydrogen halide in the gas phase over the halogenation mass, a convenient way to reduce the molar proportion of hydrogen halide in the gas phase is to employ an excess of halogen. The excess halogen dilutes the gaseous hydrogen halide to the extent in which it is present. For commerical operation, the excess halogen may be recovered by refrigeration, for example. Other means for reducing the molar proportion of hydrogen halide include the introduction of inert gases, such as dry nitrogen or carbon dioxide, or operation in the presence of an inert, volatile solvent such as a fully halogenated low molecular weight aliphatic hydrocarbon. In either case, the inert gas or inert solvent vapors reduce the molar proportion of hydrogen halide in the gas phase.

Another method of controlling the hydrogen halide concentration in the liquid reaction mass relates to liquid-gas contacting. This contacting must be efficient to obtain halogenation and to maintain the hydrogen halide concentration at a low level. Prior art teaches the importance of good liquid-gas contacting in dissolving chlorine in the reaction mass and toward this end suggests subdivision of the chlorine gas into small bubbles and introduction of chlorine into a zone where vigorous agitation exists. The prior art does not recognize the importance of intimate liquid-gas contacting throughout the entire reaction mass which is required if the hydrogen halide concentration in the liquid phase is to be maintained at a level approaching the equilibrium concentration set by the temperature and partial pressure of hydrogen halide in the gas phase. While previously explained methods of reducing the hydrogen halide concentration are helpful to this end, they must be coupled with the step of intimately mixing the halogen reactant throughout the liquid medium containing the alkyl-substituted aromatic isocyanate in order that the by-product hydrogen halide may quickly escape from the medium. Use of this intimate mixing step at prior art temperature and pressures will obtain some improvement, but the conditions set forth are preferred.

In order to achieve good gas-liquid contact throughout the volume of the halogenation zone, it is necessary to employ violent agitation in conventional batch kettles or to resort to more specialized types of contacting equipment. In conventional batch halogenation equipment consisting of an agitated kettle, it is almost impossible to furnish sufficient power input on any but the smallest scale. Countercurrent operation in packed towers, bubble cap or sieve plate towers is more economical for obtaining suitable contacting on a large scale. In these, the isocyanate flows down; the gases flow up. Such towers should have a high length-diameter ratio so that the linear velocity of gas flow is large. This produces excellent contacting throughout all of the reaction mass contained in the tower. Devices which contact gases with the halogenation mass in the form of a thin film may also be used. A convenient form of this type of equipment flows a film of liquid down the walls of a vertical tube bundle while gases pass up the tubes.

In general, continuous countercurrent equipment is preferred for carrying out the halogenation. It allows the least reactive substrate to react with the highest possible concentration of chlorine. Moreover, the high concentration of halogen improves the removal of hydrogen halide and so provides additional compensation for the loss of rate due to the degree of halogenation. While countercurrent operation is preferred, concurrent flow of gases and liquid in turbannular pipe-line reactors may be used to provide adequate gas-liquid contact. In these reactors, the flow of gas is adjusted to such a high linear velocity in the pipe line that the liquid is essentially blown along the wall of the pipe in the form of a thin turbulent film. Obviously, any device which will achieve excellent gas-liquid contact throughout the entire volume of the halogenation zone may be used to assist in meeting the requirement of reducing the hydrogen halide concentration to preferably less than 0.6 meq./g. of reaction mass.

By adjusting the above conditions which affect hydrogen halide concentration, it is possible to operate the present improved process at hydrogen halide concentrations below 0.6 meq./g. While any hydrogen halide concentration less than 0.6 meq./g. yields a significantly better product than previously attainable, concentrations below about 0.3 meq./g. give even better results. Generally, it is desirable to conduct the polyhalogenation step at the lowest concentration of hydrogen halide which is consistent with product quality and economic requirements. In the case of tolylene diisocyanate, hydrogen halide concentrations of about 0.2 meq./g. or less may be achieved under practical conditions.

In order to establish operation of the improved process of this invention it is necessary to have a means for determining the hydrogen halide concentration of the reaction mass. This may be accomplished by dissolving 1 to 2 grams of reaction mass in 200 ml. of n-propanol and titrating to a potentiometric end point with 0.1 N KOH in methanol. The sample used in this determination should be taken directly from the reaction mass during the halogenation. It should be handled so as to avoid the loss of hydrogen halide. Using a glass-calomel electrode system, three end-points are obtained on the crude halogenation mass samples. Only the first of these three end-points, which corresponds to hydrogen halide need be determined. The second and third breaks appear to be related to ferric halide and alpha-halogenated isocyanate respectively. With the aforementioned electrode system, the three end-points occur at apparent pH values of about 4 to 5.5, 6.5 to 8 and 9.5 to 10.5.

The improved process of the present invention may be used to prepare ring halogenated derivatives of alkyl-substituted aromatic mono-, di- and polyisocyanates. It is especially useful for halogenating benzene and napthalene derivatives bearing at least one alkyl group and at least one isocyanato group. Representative isocyanates include o-, m- and p-tolyl isocyanates, 2,4- and 2,6-tolylene diisocyanates, 4-ethylphenyl isocyanate, dodecylphenyl isocyanate, mesitylene diisocyanate, cumene-2,4-diisocyanate and toluene-2,4,6-triisocyanate. The process is particularly useful for preparing ring halogenated tolylene diisocyanate derivatives which may contain amounts of halogen approaching three halogens per molecule.

The process of this invention may be used to prepare chlorinated or brominated derivatives depending on the halogen employed. In producing brominated derivatives it is desirable to employ bromine monochloride as the halogenating agent rather than bromine itself. The use of bromine increases the proportion of tars and alpha-halogenated isocyanate byproducts. In addition, bromine is much more expensive than bromine monochloride. Halogenated derivatives containing both chlorine and bromine may also be prepared by using bromine monochloride plus chlorine as the halogenating agent. In preparing derivatives containing both halogens, it is usually desirable to carry out the bromination prior to the chlorination since better use of the more expensive halogen is obtained. In batch operation, this may be accomplished by adding bromine monochloride and chlorine consecutively. In continuous equipment such as bubble cap or sieve tray towers, this may be accomplished by feeding chlorine to the bottom of the tower where the halogenation is completed and introducing bromine into the upper half of the tower where the halogenation is only partially complete. The introduction of bromine is entirely satisfactory in this case because excess chlorine to produce bromine monochloride is present.

The number of halogen substituents which may be introduced into each molecule of isocyanate may range from about one up to the number of open ring positions on the isocyanate involved. For example, one to three hologens may be introduced into tolylene diisocyanate isomers while up to four halogens may be introduced into tolyl isocyanate isomers. As previously explained, the improved process of the present invention assumes greater importance as the degree of halogenation increases. The products resulting from the present process normally will be a mixture of isomers having differing degrees of halogen substitution unless the product is fully halogenated. In the case of tolylene diisocyanate, for instance, a product which is predominantly dichlorinated will contain in addition some mono- and tri-chlorinated diisocyanates. For most purposes, there is no need to separate the various halogenated derivatives, but this may be done by conventional physical separation techniques such as distillation and recrystallization if required. When it is desirable to produce a product which has predominantly a given degree of halogen substitution, operation in a column having many stages is effective in minimizing products containing more or less halogen.

The following examples, in which parts and percents are by weight unless otherwise indicated, are illustrative of the process of the present invention.

EXAMPLE 1

The experiment reported in this example was conducted essentially according to the procedures disclosed in U.S. Patent No. 2,915,545. Five liters of a tolylene diisocyanate (TDI) isomer mixture (80% 2,4-isomer; 20% 2,6-isomer) is poured in a 12 liter four-neck flask equipped with a thermometer, a fritted glass gas disperser, an open condenser through which gas can exit, and a dip-leg for sampling. The flask is also equipped with a central paddle agitator which is driven at about 700 r.p.m. by an electric motor rated at 1/80 H.P.

The contents of the flask are protected from atmospheric moisture by sweeping with nitrogen. The contents of the flask are brought to 90° C. and 90 g. of anhydrous ferric chloride (1.5% by weight based on the 6100 g. of disocyanate) is added to the stirred diisocyanate. Chlorine gas is fed to the flask through the fritted glass gas disperser below the surface of the diisocyanate while the agitator is run at full power. Chlorine is fed at a rate of 20 g./min. for 880 minutes during which time the temperature is maintained at about 90° C. This is the operating temperature suggested by U.S. Patent 2,915,545, for the tolylene diisocyanate.

Samples of the reaction mass are removed periodically during the course of the chlorination. Sampling is accomplished by pressurizing the flask to about 1 p.s.i. which forces the reaction mass through the dip-leg into previously tarred flasks or vials.

The samples taken in flasks are weighed and then distilled to dryness at a reduced pressure of 1 to 2 min. of Hg. The final temperature of the distillation is about 240° C. The vapor pathway of the distillation equipment has a circular cross section about 20 mm. in diameter and a length of about 250 mm. It leads to a receiver immersed in "Dry Ice." By this procedure, the weight of the distillate, the weight of non-volatile residue and the weight loss (presumably noncondensables) are obtained. The distilled products are analyzed for total chlorine present as a result of alpha-halogenation of the tolylene diisocyanate ("active" halogen) is determined in the distillate by dissolving a 2.5–3.0 g. sample in a mixture of 30 ml. of 10% aqueous potassium hydroxide and 30 ml. of tetrahydrofuran, refluxing for 2 hours, acidifying and titrating an aliquot potentiometrically with silver nitrate as the titrant.

The samples taken in the vials are dissolved in n-propanol and hydrogen chloride is determined potentiometrically as described hereinbefore.

Detailed experimental data, analytical results and derived data are present in Table I.

TABLE I.—BATCH CHLORINATION OF TOLYLENE DIISOCYANATE (TDI) IN AN AGITATED VESSEL

|  | 1 | 2 | 3 | 4 | 5 | 6 | 7 |
|---|---|---|---|---|---|---|---|
| Time, min | 260 | 345 | 430 | 520 | 640 | 760 | 880 |
| Chlorine fed, g | 5,600 | 6,881 | 8,243 | 9,468 | 11,223 | 13,217 | 15,288 |
| Chlorine reacted, g | 4,100 | 5,000 | 5,640 | 6,100 | 6,440 | 6,620 | 6,500 |
| Hydrogen chloride conc. in reaction mass, meq./g | 0.90 | 0.87 | 0.86 | 0.86 | 0.86 | 0.87 | 0.89 |
| Distillation results: |  |  |  |  |  |  |  |
| Loss, percent | 9.1±0.2 | 9.1±0.2 | 9.1±0.2 | 9.1±0.2 | 9.1±0.2 | 9.1±0.2 | 9.1±0.2 |
| Residue, percent [1] | 9.6 | 9.0 | 9.0 | 9.0 | 9.4 | 9.2 | 11.3 |
| Distillate, percent [1] | 90.4 | 91.0 | 91.0 | 91.0 | 90.6 | 90.8 | 88.7 |
| Analysis of distillate: |  |  |  |  |  |  |  |
| Total chlorine, percent | 25.15 | 29.0 | 31.6 | 33.3 | 34.5 | 35.2 | 34.7 |
| Alpha-chlorine, percent | 1.75 | 3.3 | 4.6 | 5.0 | 5.3 | 5.8 | 4.3 |
| Ring chlorine, percent | 24.4 | 25.7 | 27.0 | 28.3 | 29.2 | 29.4 | 30.4 |
| Gr.-atoms ring chlorine/Mole TDI | 1.53 | 1.75 | 1.93 | 2.06 | 2.16 | 2.19 | 2.25 |
| Gr.-atoms alpha-chlorine/Mole TDI | 0.11 | 0.23 | 0.32 | 0.36 | 0.39 | 0.43 | 0.32 |

[1] The values for residue, percent, and distillate, percent, are calculated by the following expressions after subtracting the calculated weight of ferric chloride from the residue weight:

$$\text{Residue, percent} = \frac{100 \times \text{Weight of Residue}}{\text{Weight of Residue} + \text{Distillate}}$$

$$\text{Distillate, percent} = \frac{100 \times \text{Weight of Distillate}}{\text{Weight of Residue} + \text{Distillate}}$$

This example shows that even though chlorine is supplied in large excess and good agitation is furnished, the gas-liquid contact is inadequate to transfer hydrogen chloride from the liquid to the gas phase so as to reduce hydrogen halide concentration below 0.6 meq./g. Operation at the high concentrations obtained in this experiment leads to the formation of about 9–10% residue. In addition, 30 to 40 mole percent of the distilled product contains alpha-halogen if it is assumed that only monosubstitution of chlorine occurs on the methyl group.

EXAMPLE 2

A solution of 1.48% ferric chloride in an isomer mixture of tolylene diisocyanate (80% 2,4-isomer; 20% 2,6-isomer) is fed continuously at a rate of 38 g./min. to the top plate of a sieve plate tower which serves as a reactor. The tower has an inside diameter of 2 in. and contains 21 plates spaced 11½ in. apart. The plates each contain 114 holes (1/16 in. diameter) and a J-leg (3/8 in. inside diameter) through which the gas phase rises and the liquid phase descends respectively. Chlorine gas is fed below the bottom plate of the tower at a rate of 68 g./min. The tolylene diisocyanate passes down the tower where it is chlorinated and is then removed continuously through an overflow leg attached to the bottom of the column. Chlorine passes up the column and becomes less concentrated as it is consumed and is replaced by hydrogen chloride which is evolved as a by-product. The mixture of chlorine and hydrogen chloride gas reaching the top of the column is discharged at atmospheric pressure. The column is equipped for heating and cooling so that the temperature of the column contents may be maintained at about 90° C. throughout.

After the column has reached equilibrium, samples of material are removed from the column representing the liquid on the fourth plate and the liquid leaving the column beyond the 21st plate.

Samples are analyzed for hydrogen chloride by the procedure detailed in Example 1. Additional samples are distilled and analyzed for total chlorine and alpha-chlorine as in Example 1.

Experimental details, analytical data and derived data are presented in Table II.

TABLE II.—CONTINUOUS CHLORINATION OF TOLYLENE DIISOCYANATE IN A SIEVE PLATE TOWER REACTOR

|  | Sample Point | |
|---|---|---|
|  | Top of plate No. 4 | Exit below Plate No. 21 |
| Hold time, min | 47 | 198 |
| Total liquid hold-up, ml | 7,400 | 7,400 |
| Tolylene diisocyantate fed, g./min | 37.2 | 37.2 |
| Chlorine fed, g./min | 68 | 68 |
| Avg. liquid flow, ml./min | 37.2 | 37.2 |
| Excess chlorine at top of column, percent | 70 | 70 |
| Hydrogen chloride conc. in reaction mass, meq./g | 0.20 | 0.08 |
| Distillation results: |  |  |
| Loss, percent | 2.3 | 1.4 |
| Residue, percent [1] | 3.2 | 2.5 |
| Distillate, percent [1] | 96.8 | 97.5 |
| Analysis of Distallate: |  |  |
| Total chlorine, percent | 27.4 | 35.0 |
| Alpha-chlorine, percent | 0.02 | 0.29 |
| Ring chlorine, percent | 27.4 | 34.7 |
| Gr.-atoms ring chlorine/Mole TDI | 1.84 | 2.58 |
| Gr.-atoms alpha-chlorine/Mole TDI | 0.0015 | 0.021 |

[1] The values for residue, percent, and distillate, percent, are calculated by the following expressions after subtracting the calculated weight of erric chloride from the residue weight:

$$\text{Residue, percent} = \frac{100 \times \text{Weight of Residue}}{\text{Weight of Residue} + \text{Distillate}}$$

$$\text{Distillate, percent} = \frac{100 \times \text{Weight of Distillate}}{\text{Weight of Residue} + \text{Distillate}}$$

This example illustrates a manner of increasing the efficiency of gas-liquid contact within the reaction mass so as to decrease the hydrogen halide concentration therein. Conditions for achieving the excellent transfer of dissolved hydrogen chloride from the liquid to the gas phase are obtained by employing excess chlorine in a column having a high length/diameter ratio. Both of these factors result in a high gas velocity, which in turn provides vigorous, turbulent agitation and excellent gas-liquid contact throughout the entire volume of the column. In addition, the plates of the column provide excellent dispersion of the gases flowing up the column. The hydrogen chloride concentration is below the 0.6 meq./g. level suggested. The values observed for hydrogen chloride concentration demonstrate the improved removal of hydrogen halide in the lower part of the reactor where the concentration of chlorine is high. Operation under these conditions leads to the formation of only 2 to 3% residue. The distilled product contains only about 2 mole percent of diisocyanate which is alpha-chlorinated. The degree of ring chlorination, as indicated by the gram-atoms of ring chlorine/mole TDI, is higher in this example after 198 minutes than that achieved after 880 minutes in Example 1. This illustrates that the rate of ring halogenation may be maintained at a high value if hydrogen halide is removed from the reaction mass efficiently.

EXAMPLE 3

This example illustrates the preparation of a ring halogenated alkyl-substituted aromatic isocyanate in which both bromine and chlorine are introduced.

A solution of 1.3% ferric chloride dissolved in an isomer mixture of tolylene diisocyanate (80% 2,4-isomer; 20% 2,6-isomer) is fed continuously at a rate of 62 g./min. to the top plate of the column reactor described in Example 2. Chlorine is introduced into the column below the bottom plate at a rate of 53 g./min. Bromine vapor is introduced into the column between the 9th and 10th plates (counting from the top of the column) at a rate of 30 g./min. The column temperature is maintained at about 100° C. throughout its length.

After the column has reached equilibrium, samples of the material leaving the bottom of the column are taken. Titration of this material indicates a hydrogen halide concentration of 0.1 meq./g. Distillation results in a loss of 2.6% and yields 94% distillate and 6% residue, calculated as in Example 2. The distilled product contains about 7 mole percent of diisocyanate containing alpha-halogen substitution. The distilled product contains 13% ring substituted chlorine and 29% ring substituted bromine.

In an effort to make this type of product in the equipment of Example 1, bromine monochloride is introduced first and is then followed by the addition of chlorine. The product produced is so contaminated with reactive by-products and volatiles that attempted distillation is prevented by gas evolution of such vigor as to disjoint the distillation equipment.

Other alkyl-substituted aromatic isocyanates can be halogenated according to the improved process described in the foregoing Examples 2 and 3 and similarly improved results will be obtained. Other methods of reducing the concentration of hydrogen halide will be obvious to those skilled in the art and are within the scope of this invention which is the first recognition of the benefits to be so obtained.

I claim:
1. In the process of ring halogenating alkyl-substituted aromatic isocyanate in the presence of a catalyst selected from the group consisting of ferric chloride and ferric bromide, said isocyanate and said catalyst forming a liquid system, the improvement comprising intimately mixing a halogen reactant throughout said liquid system, said halogen reactant being selected from the group consisting of chlorine, bromine, bromine monochloride and mixture thereof, and, maintaining the concentration of hydrogen halide by-product in said liquid system below 0.6 meq./g. of said system during halogenation.

2. In the process of claim 1 wherein the concentration of hydrogen halide by-product is maintained below 0.3 meq./g. of said system.

3. In the process of preparing ring-halogenated toluene diisocyanate by contacting the diisocyanate with a halogen reactant selected from the group consisting of chlorine, bromine, bromine monochloride, and mixtures thereof in the presence of a catalytic amount of a ferric halide selected from the group consisting of chloride and bromide, the improvement comprising intimately mixing said halogen reactant with said diisocyanate and said catalyst, and, maintaining the concentration of hydrogen halide by-product in the resulting reaction mass below 0.6 meq./g. of said reaction mass during halogenation.

4. In the process of preparing ring-halogenated tolylene diisocyanate by contacting the diisocyanate with a halogen reactant selected from the group consisting of chlorine, bromine, bromine monochloride, and mixtures thereof in the presence of a catalytic amount of a ferric halide selected from the group consisting of chloride and bromide, the improvement comprising intimately mixing said halogen reactant with said diisocyanate and said catalyst, and, maintaining the concentration of hydrogen halide by-product in the resulting reaction mass below 0.6 meq./g. of said reaction mass during halogenation and thereafter heating said reaction mass to a temperature in the range of 150° to 220° C. and simultaneously removing residual hydrogen halide therefrom.

References Cited

UNITED STATES PATENTS

| | | | |
|---|---|---|---|
| 2,077,382 | 4/1937 | Engs et al. | 260—166 |
| 2,915,545 | 12/1959 | Tanzuma | 260—453 |
| 2,945,875 | 7/1960 | Tanzuma | 260—453 |

FOREIGN PATENTS 835,592  5/1960  Great Britain.

CHARLES B. PARKER, *Primary Examiner.*

D. H. TORRENCE, *Assistant Examiner.*

U.S. Cl. X.R.

260—2.5, 694; 23—152